UNITED STATES PATENT OFFICE.

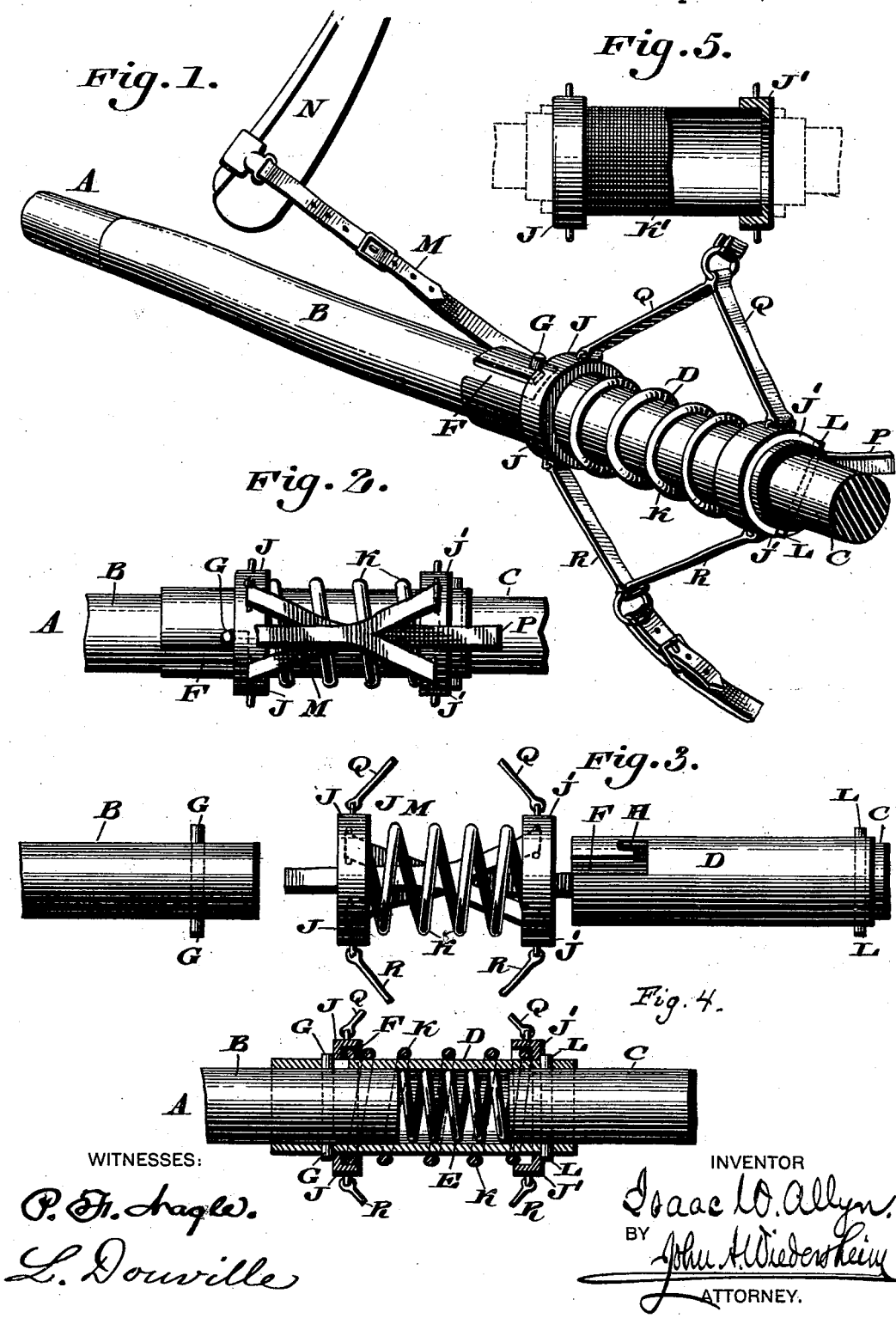

ISAAC W. ALLYN, OF PHILADELPHIA, PENNSYLVANIA.

DEVICE FOR ATTACHING HARNESS TO VEHICLES.

SPECIFICATION forming part of Letters Patent No. 558,249, dated April 14, 1896.

Application filed January 11, 1893. Serial No. 575,103. (No model.)

*To all whom it may concern:*

Be it known that I, ISAAC W. ALLYN, a citizen of the United States, residing in the city and county of Philadelphia, State of Pennsylvania, have invented a new and useful Improvement in Devices for Attaching and Detaching Horses' Harness to or from Vehicles, which improvement is fully set forth in the following specification and accompanying drawings.

My invention consists of a device for attaching and detaching the harness of horses and other animals to the shafts of a vehicle, avoiding the use of traces and singletrees, as will be hereinafter set forth.

Figure 1 represents a perspective view of a harness attaching and detaching device embodying my invention. Fig. 2 represents a top or plan view thereof. Fig. 3 represents a side elevation, the parts being separated. Fig. 4 represents a longitudinal section. Fig. 5 represents partial side elevation and partial longitudinal section of a modification.

Similar letters of reference indicate corresponding parts in the several figures.

Referring to the drawings, A designates the shaft of a vehicle, the same being formed in sections B C. Connected with the forward end of the section C is the sleeve D, which receives the rear end of the section B. Interposed between the adjacent ends of said sections B and C is the spring E, whose tendency is to advance the section B or press the same in forward direction.

In the front end of the sleeve D are the L-shaped slots F, which are adapted to receive the pins G, which project radially from the section B near the end thereof, forming together a bayonet-joint, it being evident that when said pins G are seated in the limbs H of said slots F the two sections are firmly coupled, as will be most clearly shown in Figs. 1 and 4.

Freely fitted on the sleeve D are the collars J J', to which is attached or with which engages the spring K, which in Figs. 1, 2, 3, and 4 freely encircles said sleeve D. The forward motion of the front collar J is limited by the pins G, and the rearward motion of the other collar J' is limited by the pins L, which project from the section C of the shafts near the front thereof. To the collars J J' are attached the straps M, which are also attached to the hames of the collar N or a breast-strap when employed. To said collars are also attached the holdback or breeching strap P, the straps Q, which are connected with the saddle, and the straps R, with which the belly-band is connected.

It will be seen that when the parts are in position (shown in Figs. 1, 2, and 4) the draft of the animal is transmitted through the harness to the shafts, the effect of which is evident, it being noticed that traces and singletrees are dispensed with. When, however, the animal is to be taken out of the shafts, the sections B are pushed back, so as to place the pins G in position, permitting said section to be turned, thus unlocking the bayonet-joint, after which the sections are drawn forward, and thus entirely removed from the sleeves D.

As the pins G are on the sections B, there is no obstacle to the forward motions of the collar J and the connected parts or the rearward motions of the sleeves D with the sections C, whereby said collars are stripped from said sleeves, and the harness is accordingly detached from the shafts.

When the collars are reapplied to the sleeves D and the pins G of the section B interlocked with said sleeves, the sections B and C are coupled or united as one, and the vehicle may be drawn by the animal, as before, it being noticed that the spring E provides a yielding connection for the harness with the shafts, so that the draft is easy and strain on the parts prevented.

In Fig. 5 I show a rubber spring K' on the sleeve in lieu of the coiled metal spring K shown in the other figures without producing different results.

The pins G are made removable in cases where it is not desired to uncouple the sections of the shaft, in which case, when said pins are withdrawn, the collars J J' and their connections and springs K may slip forwardly over the sleeves D and front ends of the shafts, thus detaching the animal from the vehicle.

Having thus described my invention, what I claim as new, and desire to secure by Letters Patent, is—

1. A shaft formed of separable sections, and provided with means for detachably connecting harness therewith, and means for coupling said sections, substantially as described.

2. A shaft, formed in sections, detachably connected, a sleeve on one section adapted to receive the end of the other section, collars on said sleeve, parts of harness attached to said collars, and means for retaining said collars on the shaft, substantially as described.

3. A shaft provided with a detachable pin, a movable collar on said shaft limited by said pin, and harness attachments secured to said collar, said shaft being formed in sections with means for coupling and uncoupling the sections, the parts being combined, substantially as described.

4. A harness-attaching device consisting of collars movable on the shaft of a vehicle, a spring interposed between said collars, stops on the shaft for controlling said collars, and means for connecting the adjacent parts of the harness with said collars, said shaft being formed in sections and provided with means for coupling and uncoupling the sections, substantially as described.

5. A shaft formed in sections, a sleeve connected with one of said sections and freely receiving the end of the other section, a joint for locking or coupling the last-named section, and said sleeve, a spring interposed between the sections for closing said joint, a movable collar on said sleeve, stops on the sections of the shaft, and means for connecting the adjacent parts of the harness with said collar, whereby when sections of the shaft are uncoupled the collar and connected harness may be entirely removed from the other section of the shaft, substantially as described.

ISAAC W. ALLYN.

Witnesses:
JOHN A. WIEDERSHEIM,
R. H. GRAESER.